US012684550B2

(12) United States Patent
Hong

(10) Patent No.: US 12,684,550 B2
(45) Date of Patent: Jul. 14, 2026

(54) BEAM MANAGEMENT METHOD AND APPARATUS, COMMUNICATION DEVICE, AND STORAGE MEDIUM

(71) Applicant: Beijing Xiaomi Mobile Software Co., Ltd., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 835 days.

(21) Appl. No.: 17/915,718

(22) PCT Filed: Apr. 2, 2020

(86) PCT No.: PCT/CN2020/083020
§ 371 (c)(1),
(2) Date: Sep. 29, 2022

(87) PCT Pub. No.: WO2021/196134
PCT Pub. Date: Oct. 7, 2021

(65) Prior Publication Data
US 2023/0128129 A1      Apr. 27, 2023

(51) Int. Cl.
| | |
|---|---|
| *H04W 72/044* | (2023.01) |
| *H04L 5/00* | (2006.01) |
| *H04W 24/10* | (2009.01) |
| *H04W 72/0453* | (2023.01) |

(52) U.S. Cl.
CPC ......... *H04W 72/046* (2013.01); *H04L 5/0048* (2013.01); *H04W 24/10* (2013.01); *H04W 72/0453* (2013.01)

(58) Field of Classification Search
CPC ..... H04L 5/0048; H04L 5/001; H04L 5/0023;
H04L 5/0092; H04W 24/10; H04W 72/0453; H04W 16/28; H04W 24/08; H04W 64/006; H04W 72/046; H04B 7/0695; H04B 7/0617
See application file for complete search history.

(56) References Cited

U.S. PATENT DOCUMENTS

| | | | | |
|---|---|---|---|---|
| 6,286,104 | B1 * | 9/2001 | Buhle | H04L 63/105 |
| | | | | 707/999.009 |
| 10,523,347 | B2 * | 12/2019 | Hwang | H04L 5/0048 |
| 11,172,391 | B2 * | 11/2021 | Chen | H04B 7/0695 |
| 11,259,308 | B2 * | 2/2022 | Feng | H04W 72/23 |
| 11,445,484 | B2 * | 9/2022 | Qin | H04W 72/21 |

(Continued)

FOREIGN PATENT DOCUMENTS

| | | |
|---|---|---|
| CN | 101925130 A | 12/2010 |
| CN | 101998631 A | 3/2011 |

(Continued)

OTHER PUBLICATIONS

Nokia, Nokia Shanghai Bell, "Summary of open issues related to rate-matching in NR," 3GPP TSG-RAN WG1 AH1801, R1-1801039,Jan. 27, 2018 (Jan. 27, 2018).

*Primary Examiner* — Brian T O Connor
(74) *Attorney, Agent, or Firm* — Volpe Koenig

(57) ABSTRACT

A beam management method is described. The beam management method, which is applied to a base station, includes: transmitting configuration information for performing individual beam management on a secondary carrier according to beam management capability information of a terminal.

20 Claims, 12 Drawing Sheets

Carrier 1          Carrier 2

The ith beam of carrier 2

Base station

The ith beam of carrier 1

Terminal

(56)    References Cited

U.S. PATENT DOCUMENTS

| | | | |
|---|---|---|---|
| 11,595,840 B2 * | 2/2023 | Da Silva .............. | H04B 7/0695 |
| 11,626,952 B2 * | 4/2023 | Zhang ................... | H04L 5/0094 |
| | | | 370/329 |
| 11,736,180 B2 * | 8/2023 | Raghavan ............ | H04B 7/0626 |
| | | | 370/329 |
| 12,323,215 B2 * | 6/2025 | Sakhnini .............. | H04B 7/0404 |
| 2020/0280378 A1 * | 9/2020 | Hwang ................ | H04B 17/309 |
| 2021/0306051 A1 * | 9/2021 | Sakhnini ............. | H04W 72/046 |
| 2022/0264561 A1 * | 8/2022 | Fan ....................... | H04B 7/0695 |
| 2024/0056233 A1 * | 2/2024 | Kim .......................... | H04L 5/00 |

FOREIGN PATENT DOCUMENTS

| | | |
|---|---|---|
| CN | 109699037 A | 4/2019 |
| CN | 109756312 A | 5/2019 |

* cited by examiner

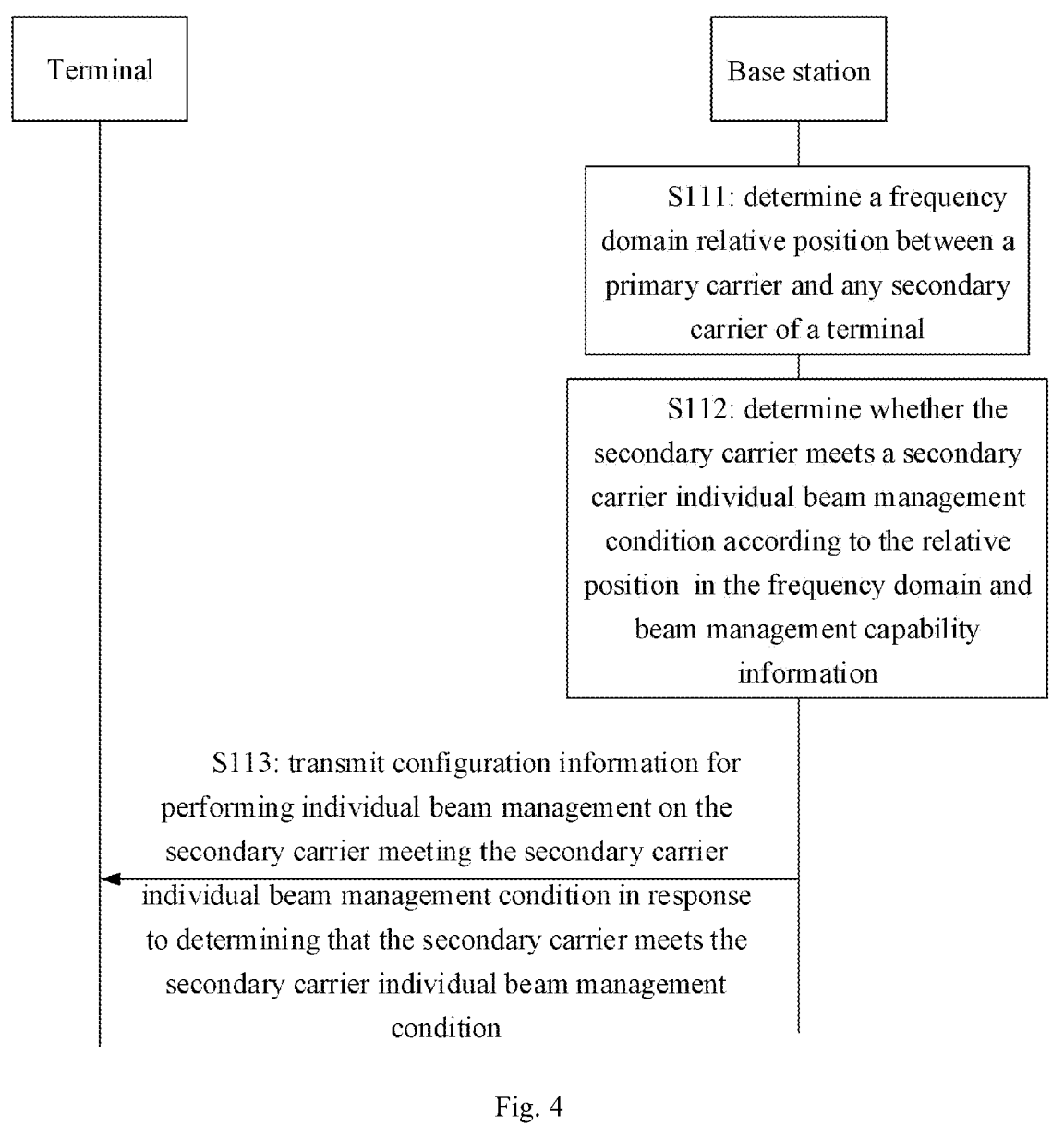

Terminal

Base station

S111: determine a frequency domain relative position between a primary carrier and any secondary carrier of a terminal S112: determine whether the secondary carrier meets a secondary carrier individual beam management condition according to the relative position in the frequency domain and beam management capability information S113: transmit configuration information for performing individual beam management on the secondary carrier meeting the secondary carrier individual beam management condition in response to determining that the secondary carrier meets the secondary carrier individual beam management condition

Fig. 4

BEAM MANAGEMENT METHOD AND APPARATUS, COMMUNICATION DEVICE, AND STORAGE MEDIUM

CROSS REFERENCE TO RELATED APPLICATION

The present application is a U.S. National Stage of International Application No. PCT/CN2020/08302, filed on Apr. 2, 2020, the contents of all of which are incorporated herein by reference in their entireties for all purposes.

BACKGROUND

With the development of a mobile communication technology, high-frequency and large-bandwidth, and large-scale antenna technology is increasingly becoming the development trend of the wireless communication technology, to meet the requirements of the higher rate. At present, it has become the main technical feature of the millimeter wave band of fifth-generation communication.

SUMMARY

The disclosure relates to but is not limited to the technical field of wireless communication, in particular to a beam management method and apparatus, a communication device, and a storage medium.

An example of the disclosure provides a beam management method and apparatus, a communication device, and a storage medium.

A first aspect of the example of the disclosure provides a beam management method, applied to a base station, and including:

transmitting, according to beam management capability information of a terminal, configuration information for performing individual beam management on a secondary carrier.

A second aspect of the example of the disclosure provides a beam management method, applied to a terminal, and including:

receiving configuration information for performing individual beam management on a secondary carrier, where the configuration information is determined based on management capability information of the terminal; and performing individual beam management on the secondary carrier according to the configuration information.

A third aspect of the example of the disclosure provides a communication device, including a processor, a transceiver, a memory and an executable program stored on the memory and capable of being operated by the processor, in which the executable program, when operated by the processor, executes the beam management method provided by any technical solution of the first aspect or the second aspect.

A fourth aspect of the example of the disclosure provides a computer storage medium, storing an executable program, in which the executable program, after being executed by a processor, can implement the beam management method provided by any technical solution of the first aspect or the second aspect.

BRIEF DESCRIPTION OF THE DRAWINGS

The accompanying drawings here are incorporated into the specification and constitute a part of the specification, show examples consistent with the disclosure, and together with the specification, are used to explain the principle of the examples of the disclosure.

FIG. 4 is a schematic flow diagram of a beam management method illustrated according to an example.

DETAILED DESCRIPTION

Examples will be described in detail here, and instances are shown in the accompanying drawings. When the following description refers to the accompanying drawings, unless otherwise indicated, the same numbers in different drawings indicate the same or similar elements. The implementations described in the following examples do not represent all implementations consistent with the examples of the disclosure. Rather, they are merely instances of apparatuses and methods consistent with some aspects of the examples of the disclosure as detailed in the appended claims.

The terms used in the examples of the disclosure are merely for the purpose of describing specific examples, and are not intended to limit the examples of the disclosure. The singular forms "one", "said", and "the" used in the examples of the disclosure and the appended claims are also intended to include the plural form unless the context clearly indicates other meanings. It should also be understood that the term "and/or" as used here refers to and includes any or all possible combinations of one or more associated listed items.

In large-scale antenna technology, in order to ensure that both a transmitter and a receiver can select the optimal beam to ensure the best connection performance, it is necessary to manage beams. Because beam management requires a lot of signaling overhead, even in a multi-carrier system, unified beam management is still used; that is, it is believed that the optimal beam direction of all carriers is the same. For example, in a 5th Generation (5G) new radio (NR) system. However, in practice, due to the design capability of terminals and frequency intervals between carriers, there will be a large difference in beam direction between the carriers. If unified beam management is still used, it may cause the consequence that beam directions selected for some carriers are not the optimal direction, which may lead to poor communication quality.

It should be understood that although the terms first, second, third, etc. may be used to describe various information in the examples of the disclosure, such information should not be limited to these terms. These terms are only used to distinguish the same type of information from each other. For example, without departing from the scope of the examples of the disclosure, first information may also be referred to as second information, and similarly, the second information may also be referred to as the first information. Depending on the context, the word "if" as used here can be interpreted as "at the time" or "when" or "in response to determining".

Figure 1:
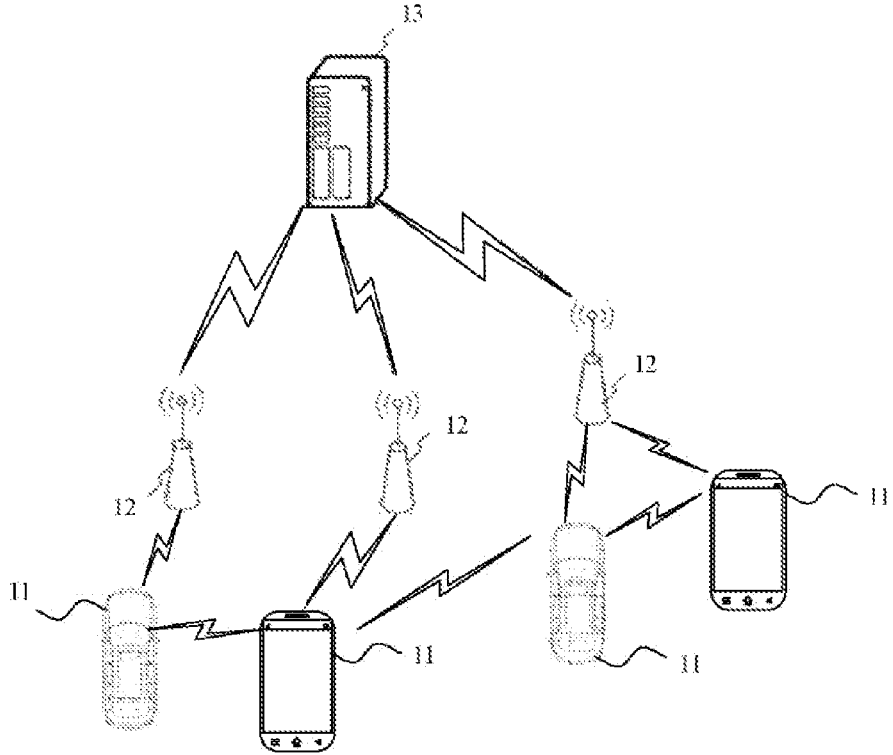
FIG. 1 is a schematic structural diagram of a wireless communication system illustrated according to an example.

Referring to FIG. 1, it shows a schematic structural diagram of a wireless communication system provided by an example of the disclosure. As shown in FIG. 1, the wireless communication system is a communication system based on a cellular mobile communication technology. The wireless communication system may include: a plurality of UEs 11 and a plurality of base stations 12.

The UE 11 may refer to devices that provide a user with voice and/or data connectivity. The UE 11 may communicate with one or more core networks via a radio access network (RAN). The UE 11 may be an internet of things UE, such as a sensor device, a mobile phone (or called cellular phone), and a computer with the internet of things UE. For example, the UE may be fixed, portable, pocket-size, hand-held, computer-built-in, or vehicle-mounted apparatus. For example, the UE may be a station (STA), a subscriber unit, a subscriber station, a mobile station, a mobile, a remote station, an access point, remote UE (remote terminal), access UE (access terminal), a user terminal, a user agent, a user device, or user equipment (UE). Or, the UE 11 may also be a device of an unmanned aircraft vehicle. Or, the UE 11 may also be a vehicle-mounted device, such as a trip computer with a wireless communication function, or a wireless communication device connected with an external trip computer. Or, the UE 11 may also be a roadside device, such as a street lamp, a signal light, or other roadside devices with a wireless communication function.

The base stations 12 may be network-side devices in the wireless communication system. The wireless communication system may be a 4th generation (4G) mobile communication system, also called a long-term evolution (LTE) system; or, the wireless communication system may also be a 5G system, also called a new radio (NR) system or 5G NR system. Or, the wireless communication system may also be a next-generation system of the 5G system. An access network in the 5G system may be called a new generation radio access network (NG-RAN). Or, the wireless communication system is an MTC (Machine Type Communication) system.

The base stations 12 may be evolved base stations (eNBs) adopted in the 4G system. Or, the base stations 12 may also be base stations (gNBs) adopting centralized and distributed architectures in the 5G system. When the base stations 12 adopt the centralized and distributed architectures, the base stations typically each include a central unit (CU) and at least two distributed units (DU). Protocol stacks of a packet data convergence protocol (PDCP) layer, a radio link control (RLC) layer and a media access control (MAC) layer are disposed in the central unit; and protocol stacks of physical (PHY) layers are disposed in the distributed units, and specific implementations of the base stations 12 are not limited in the examples of the disclosure.

The base stations 12 and the UE 11 may establish a wireless connection through wireless radio. In different implementations, the wireless radio is a wireless radio based on the 4th generation (4G) mobile communication network technology standard; or, the wireless radio is a wireless radio based on the 5th generation (5G) mobile communication network technology standard, such as new radio; or, the wireless radio may also be a wireless radio based on the next-generation mobile communication network technology standard of 5G.

In some examples, the UE 11 may also establish an end-to-end (E2E) connection. For example, vehicle-to-vehicle (V2V) communication, vehicle-to-infrastructure (V2I) communication, vehicle-to-pedestrian (V2P) communication, and the like in vehicle-to-everything (V2X) communication and other scenarios.

In some examples, the wireless communication system above may further contain a network management device 13.

The plurality of base stations 12 is connected to the network management device 13 respectively. The network management device 13 may be a core network device in the wireless communication system, for example, the network management device 13 may be a mobility management entity (MME) in an evolved packet core (EPC). Or, the network management device may also be other core network devices, such as a serving gateway (SGW), a public data network gateway (PGW), a policy and charging rules function (PCRF), or a home subscriber server (HSS). The implementation form of the network management device 13 is not limited to the examples of the disclosure.

Figure 2:
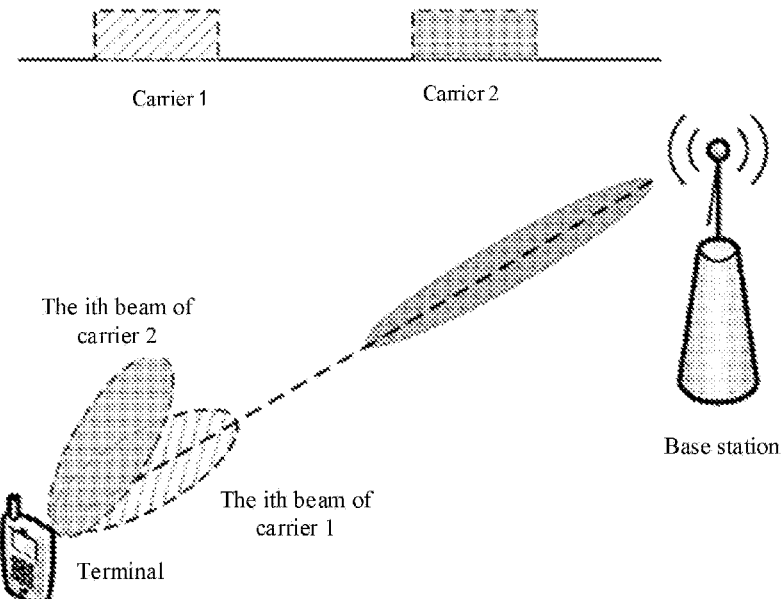
FIG. 2 is a schematic diagram of determining an optimal beam direction of different carriers illustrated according to an example.
Figure 3:
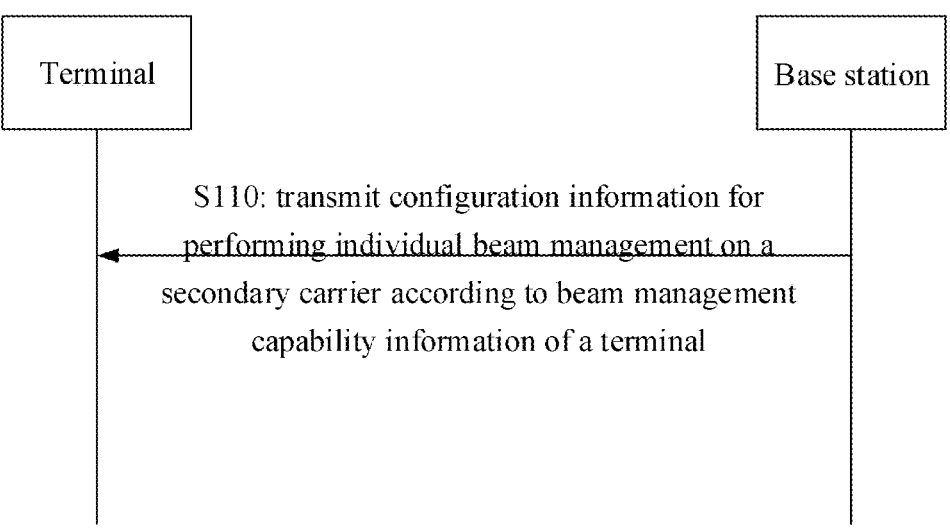
FIG. 3 is a schematic flow diagram of a beam management method illustrated according to an example.

As shown in FIG. 2, an optimal beam of a carrier 1 is determined as a beam i through beam management, a beam i of carrier 2 (shown as the i-th beam of carrier 2) and the beam i of carrier 1 (shown as the i-th beam of carrier 1) are inconsistent in direction, and if the beam i is selected on the carrier 2 by adopting unified beam management, the link performance on carrier 2 will be poor, and even the connection is lost. In order to reduce such a phenomenon, unified beam management is supported as much as possible and adopted to reduce the signaling overhead of beam management. As shown in FIG. 3, an example provides a beam management method applied to a base station, and the beam management method includes the following step S110.

In step S110, configuration information for performing individual beam management on a secondary carrier is transmitted according to beam management capability information of a terminal.

The example of the disclosure is applied to various types of base stations, such as a 4G base station or a 5G base station.

When the base station configures carriers to the terminal, for a terminal supporting multiple carriers, the terminal may be configured with a primary carrier and one or more secondary carriers. The terminal may receive and transmit control signaling on the primary carrier, and a transmission behavior of the terminal on the primary carrier and/or the secondary carrier is controlled according to the control signaling.

In some examples, the primary carrier is a carrier of a serving cell of the terminal, and the secondary carrier may be a carrier of an adjacent cell of the serving cell of the terminal.

The beam management capability information indicates: strength of a capability of a unified management mode adopted by the terminal on a plurality of carriers. For example, information content of the beam management capability information may include one or more of the following:

indication information of a strength level of a multi-carrier unified management capability of the terminal; or indication information of an inter-carrier maximum relative position on frequency domain supported by the terminal during performance of the multi-carrier unified management capability.

Different strength levels of the multi-carrier unified management capability correspond to different inter-carrier maximum relative positions on frequency domains of the strengths of the multi-carrier unified management capability; and the higher the level, the larger the inter-carrier maximum relative position on frequency domain supported during multi-carrier unified management. For example, the levels indicating the strengths of the multi-carrier unified management capability of the terminal may be divided into 2 levels, 3 levels, or 4 levels. For example, when the levels are divided into 2 levels, the strength of the multi-carrier unified management capability of the terminal may be divided into two levels of "low" and "high", and the higher the level, the higher the strength of the multi-carrier unified management capability of the terminal, and unified management of two carriers with the farther relative position on frequency domain is supported. When the levels are divided into 3 levels, the strength of the multi-carrier unified management capability of the terminal may be divided into three levels of "low", "medium" and "high", and when the levels are divided into 4 levels, the strength of the multi-carrier unified management capability of the terminal may be divided into "low", "relatively low", "relatively high" and "high". If the beam management capability information directly indicates the levels, one or more bits may be used for directly indicating the levels, for example, 1 bit is used for indicating two levels, and 2 bits are used for indicating 3 levels or 4 levels.

The unified management mode adopted here is: in order to reduce high signaling overhead caused by individually managing each beam, it is believed that the primary carrier and at least one secondary carrier are the same in optimal beam direction. In practical applications, due to the software and hardware capability of terminals and different frequencies of different carriers, substantially, the optimal beam directions of any two carriers may have a certain deviation, however, in some cases, such deviation is acceptable, namely the influence on communication quality is small, however, in some cases, the optimal beam directions of two carriers have a large deviation, and if beam management is performed based on the same management mode at this time, the communication quality on corresponding carriers will be poor, and even a link breaking phenomenon occurs.

For example, some terminals have a relatively high terminal capability. For example, a terminal containing multiple antennas or containing the antennas with a large coverage range has a relatively high unified carrier management capability, as such, even though two carriers have a relatively large optimal beam direction deviation in practice, the beam directions are still within the coverage range of the antennas of the terminal, and then the unified carrier management mode may be adopted for beam management to reduce signaling overhead. However, in the case that some terminals have few antennas or the coverage range of an antenna array is small, it is possible that only adopting the unified carrier management mode will cause poor communication quality and even the link-breaking phenomenon.

In order to solve the above phenomenon, for the secondary carrier, when the base station performs carrier management configuration on the terminal, whether individual beam management is to be performed on the secondary carrier of the terminal will be determined according to the beam management capability information of the terminal. That is, S110 may include: when it is determined that individual beam management needs to be performed on the secondary carrier of the terminal according to the beam management capability information of the terminal, the configuration information for performing individual beam management on the secondary carrier is transmitted; and/or when it is determined that individual beam management does not need to be performed on the secondary carrier of the terminal according to the beam management capability information of the terminal, the configuration information for performing individual beam management on the secondary carrier is not transmitted, and only configuration information for beam management of the primary carrier is transmitted.

In the example of the disclosure, it is default that the primary carrier of the terminal is configured with beam management. If it is determined that the terminal directly adopts unified beam management, beam measurement is performed only on the primary carrier, and the optimal beam direction is determined based on beam measurement on the primary carrier. Then, the optimal beam direction obtained by beam measurement on the primary carrier is regarded, in a unified manner, as the optimal beam direction of all carriers of the terminal. For example, one terminal is configured with N carriers, namely one primary carrier and N−1 secondary carriers, and N is a positive integer equal to or greater than 2. If unified beam management is adopted, the optimal beam direction on the primary carrier obtained based on beam measurement on the primary carrier is regarded as the optimal beam direction on all the carriers on the primary carrier and the secondary carriers at the same time.

However, if it is determined that the primary carrier and secondary carriers configured for the terminal at present adopt unified beam management based on the primary carrier according to the beam management capability information of the terminal, it is possible that the optimal beam direction determined for the secondary carriers has a too large deviation from an actual optimal beam direction of the secondary carriers, and individual beam management needs to be performed on the secondary carriers at this time.

In the example of the disclosure, beam management includes one or more of the following:

beam measurement, including: sending a reference signal on each beam on the corresponding carrier, and measuring the reference signal to obtain a measurement result; and reporting the beam measurement result;

beam indication, for example, the terminal or base station indicates a beam performing communication on any secondary carrier configured for the terminal; or beam recovery, including: how to perform beam recovery on one or more carriers after beam failure.

In a word, in the example of the disclosure, a unified beam management mode based on one carrier (e.g., the primary carrier) will not be directly adopted for the terminal, instead, whether individual beam management needs to be performed on the secondary carriers configured for the terminal is determined according to the beam management capability information of the terminal, so that the phenomena of poor communication quality on the secondary carriers and even link failure caused by unified beam management based on the primary carrier is reduced.

When the base station determines that individual beam management needs to be performed on at least one secondary carrier configured for the terminal according to the beam management capability information of the terminal, the configuration information for individual beam management of the secondary carriers is transmitted. The configuration information for individual beam management of the secondary carriers may be transmitted together with the configuration information for beam management of the primary carrier, or may also be transmitted independently. For example, in some examples, the method further includes:

the configuration information for carrier management of the terminal is transmitted according to a determination result of whether individual management on the secondary carriers of the terminal is needed; and carrier management is performed by the terminal according to the configuration information. For example, if individual management of the secondary carriers is configured for the terminal, the terminal will perform individual management on the secondary carriers according to the configuration information. Performing, by the terminal, individual management on the secondary carriers includes: measuring the reference signal on the secondary carriers and/or reporting the measurement result.

The configuration information includes first configuration for performing beam management based on the primary carrier; or first configuration for performing beam management based on the primary carrier, and second configuration for performing beam management based on the secondary carriers.

The first configuration at least includes time-frequency domain resources for sending the reference signal on the primary carrier. The second configuration at least includes: time-frequency domain resources for sending the reference signal on the secondary carriers.

In some examples, the first configuration and the second configuration further include: a reporting condition and/or a measurement condition of the measurement result. The measurement condition is a condition used to indicate the terminal to perform the reference signal on the corresponding carriers. For example, when beam quality of a currently selected beam is lower than a quality threshold value, beams of the primary carrier and the secondary carriers are measured again to determine the optimal beam direction of the primary carrier and/or the secondary carriers again. The reporting condition is used for indicating the measurement result needing to be reported after the terminal performs the reference signal on the corresponding carrier. Some measurement results are equivalent to indicating the currently selected beam direction as the optimal beam direction of the primary carrier and/or secondary carriers, and then the measurement results may not be reported. For example, if it is found that the optimal beam direction changes through beam measurement, the optimal beam direction, which is determined again, may be reported.

In the technical solutions provided by the examples of the disclosure, the base station transmits the configuration information for performing individual beam management on the secondary carrier according to the beam management capability information of the terminal, and the configuration information contains configuration information for the terminal to perform individual beam management. As such, whether the secondary carrier configured for the terminal needs individual beam management different from the primary carrier will be determined according to the beam management capability indicated by the beam capability information of the terminal, for example, when individual beam management on the secondary carrier needs to be performed, individual beam management is performed on the secondary carrier to ensure that an optimal beam direction of the secondary carrier is determined and to ensure the communication quality of communication using the secondary carrier. When individual beam management on the secondary carrier is not needed, individual beam management on the secondary carrier can be achieved based on beam management of the primary carrier, and signaling overhead is reduced through unified beam management based on the primary carrier. As such, during beam management, the communication quality is ensured, and the signaling overhead is reduced as much as possible at the same time.

In some examples, as shown in FIG. 4, the step S110 includes the following steps: S111-S113.

In step S111, a relative position on frequency domain between the primary carrier and any secondary carrier of the terminal is determined.

In step S112, whether the secondary carrier meets a secondary carrier individual beam management condition is determined according to the relative position in the frequency domain and the beam management capability information.

In step S113, the configuration information for performing individual beam management on the secondary carrier meeting the secondary carrier individual beam management condition is transmitted in response to determining that the secondary carrier meets the secondary carrier individual beam management condition.

Different carriers have different frequencies. As such, different carriers have a certain position offset in the frequency domain. In the disclosure, the relative position of two carriers in the frequency domain is measured by using the relative position on the frequency domain.

If two carriers have a relatively large frequency difference, since different frequencies have different transmission effects in the same channel, it is possible that the optimal beam directions of the two carriers have a large deviation. Thus, in the example of the disclosure, whether the secondary carrier configured for the terminal meets the secondary carrier individual beam management condition is determined in combination with the relative position on frequency domain between any secondary carrier and the primary carrier and the beam management capability information of the terminal, and if yes, beam management needs to be performed on the secondary carrier individually.

In the present example, the relative position in the frequency domain between any secondary carrier and the primary carrier and a maximum relative position in the frequency domain corresponding to the beam management capability information of the terminal are determined and compared, and if the relative position in the frequency domain of a certain secondary carrier is smaller than the maximum relative position in the frequency domain corresponding to the beam management capability indicated by the management capability information of the terminal, it is believed that the secondary carrier does not meet the secondary carrier individual beam management condition, and meets the unified management condition based on the primary carrier. If the unified management condition is met, beam management, such as beam measurement is performed only on the primary carrier according to the unified management condition based on the primary carrier, and beam management on the primary carrier is directly regarded as beam management on the secondary carrier.

In some examples, S112 may include:

it is determined that the secondary carrier with the relative position in the frequency domain to the primary carrier exceeding a unified management capability range of the terminal based on the primary carrier meets the secondary carrier individual beam management condition in response to determining that the relative position in the frequency domain to the primary carrier exceeds a unified management capability of the terminal based on the primary carrier according to the relative position in the frequency domain and the beam management capability information.

In some examples, the beam management capability information indicates that the maximum relative position in the frequency domain of unified beam management is X MHz, and if the frequency difference corresponding to the relative position on frequency domain is greater than X MHz, it is determined that the secondary carrier individual beam management condition is met, otherwise, it may be believed that the secondary carrier individual beam management condition is not met.

In other examples, when a frequency ratio representing the relative position in the frequency domain is greater than a maximum ratio corresponding to the beam management capability, it is believed that the secondary carrier individual beam management condition is met; otherwise, it is believed that the secondary carrier individual beam management condition is not met.

In the example of the disclosure, there are many relative-position parameters for indicating the relative position on the frequency domain, the relative-position parameters and threshold values corresponding to the relative-position parameters may be compared, and whether the secondary carrier individual beam management condition is met is determined based on threshold value comparison results.

Generally, the larger the frequency difference between two carriers, the more possible it is that individual beam management needs to be performed.

For example, the relative position in the frequency domain is indicated by at least one of the following parameters:

a frequency difference between center frequencies of the primary carrier and the secondary carriers; for example, the center frequency of the primary carrier is f1, and the center frequency of the secondary carriers is f2; and the frequency difference is f1−f2 or f2−f1; and a ratio of the difference between the center frequencies of the primary carrier and the secondary carriers to a sum of the center frequencies of the primary carrier and the secondary carriers; and the ratio may be: (f2−f1)/(f1+f2). In some examples, a multiple of the ratio, A*(f2−f1)/(f1+f2), may also be predefined, where A may be any positive number, for example, A may be any decimal between 0 and 1, and may be 1, 2, or 3.

The frequency difference between a frequency band of the primary carrier and a frequency band of the secondary carriers may be a frequency difference between center frequencies of the two frequency bands. For example, the frequency band of the primary carrier is A, the frequency band of the secondary carriers is B, and the center frequency of the frequency band A is f11; the center frequency of the frequency band B is f12; and at the moment, the frequency difference between the frequency band of the primary carrier and the frequency band of the secondary carriers is: f11−f12 or f12−f11.

In some examples, the relative position in the frequency domain may also be a ratio of the primary carrier to the secondary carriers. The center frequency of the primary carrier is f1, the center frequency of the secondary carriers is f2, and the ratio is f1/f2 or f2/f1.

Figure 8A:
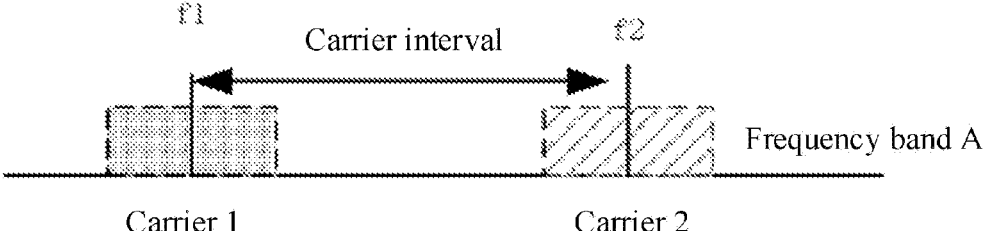
FIG. 8A is a schematic diagram of a carrier interval of a carrier illustrated according to an example.

A carrier 1 and a carrier 2 shown in FIG. 8A are located in the same frequency band A, a carrier interval between the two carriers may be a frequency difference between center frequencies of the two carriers, and this frequency difference is one of the aforementioned relative positions in the frequency domains.

Figure 8B:
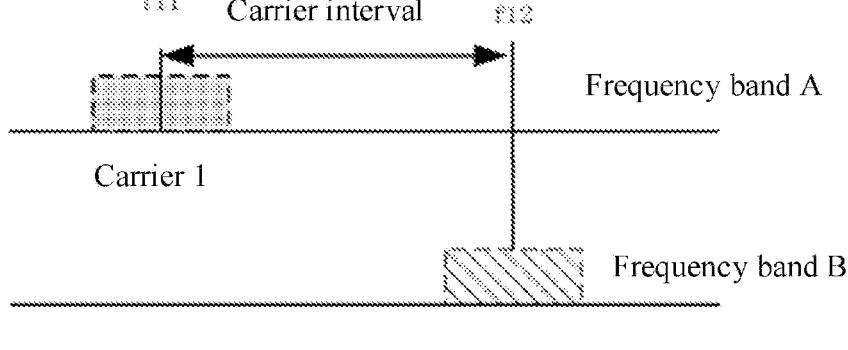
FIG. 8B is a schematic diagram of a carrier interval of another carrier illustrated according to an example.

A carrier 1 and a carrier 2 shown in FIG. 8B are located in different frequency bands, the carrier 1 is located in the frequency band A, the carrier 2 is located in the frequency band B, a carrier interval between the two carriers may be a frequency difference between center frequencies of the two carriers, and this frequency difference is one of the aforementioned relative positions in the frequency domains.

Figure 5:
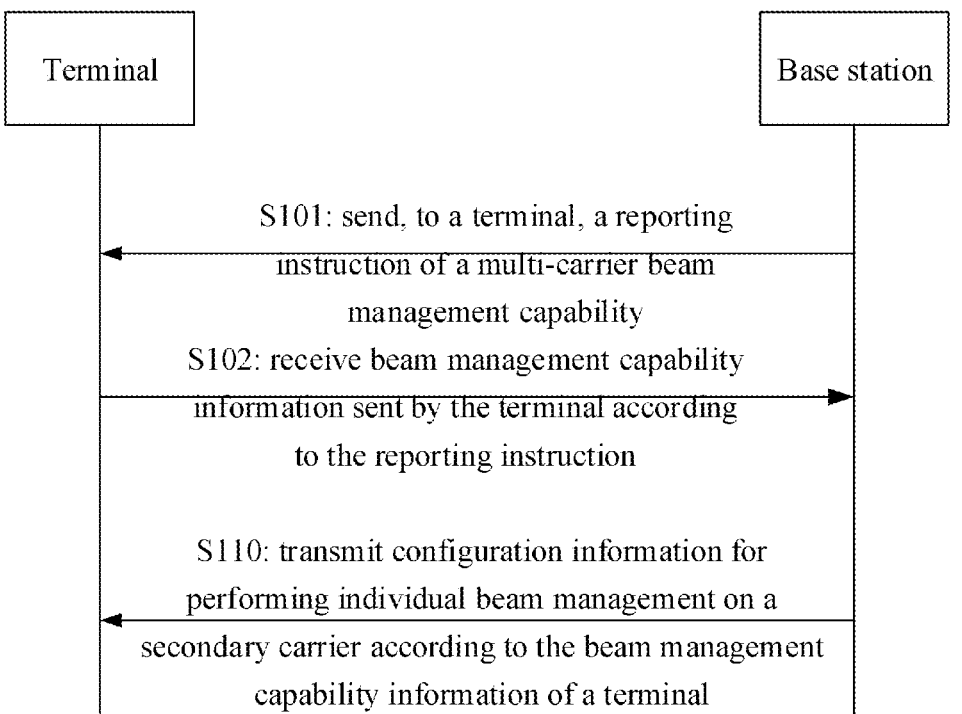
FIG. 5 is a schematic flow diagram of a beam management method illustrated according to an example.

In some examples, as shown in FIG. 5, the method further includes the following steps: S101-S102.

In step S101, a reporting instruction of a multi-carrier beam management capability is sent to the terminal.

In step S102, the beam management capability information sent by the terminal according to the reporting instruction is received.

The base station transmits the reporting instruction, and the reporting instruction indicates reporting of the beam management capability information during multi-carrier transmission of the terminal.

In some examples, the base station may receive the beam management capability information actively reported by the terminal, or speculate the beam management capability information according to the type of the terminal.

By transmitting the reporting instruction, the terminal in need is triggered to report the beam management capability information to reduce signaling overhead. Compared with the base station recording beam management capability information of all terminals, the amount of information stored in the terminal may be reduced.

In some examples, the method further includes: sending the reference signal on the secondary carrier in response to determining that the secondary carrier needing individual management exists, and receiving a measurement result of the terminal on the reference signal.

If a secondary carrier needing individual management exists, namely, a secondary carrier meeting the secondary carrier individual beam management condition exists, the reference signal is sent on the secondary carrier. For example, reference signals are sent in all beam directions by using the carrier, and the measurement result of the terminal on the reference signal is received, so that the optimal beam direction on the secondary carrier may be determined.

Further, in some examples, the terminal may support one primary carrier and a plurality of secondary carriers, at the moment, if it has been determined that one secondary carrier needs individual management, when whether the remaining secondary carriers need individual management is determined, whether individual management is needed needs to be determined according to relative position in frequency domains between the remaining secondary carriers and the primary carrier, and meanwhile, whether unified beam management may be performed with the secondary carrier which is determined to need individual management further needs to be further determined according to a relative position in the frequency domain to the secondary carrier which is determined to need individual management. In the example of the disclosure, a carrier, which is determined to need individual management is called a first carrier, and the first carrier includes, but is not limited to, the primary carrier and the secondary carrier which is determined to need individual management. Secondary carriers, which are not determined to need individual management, may be called second carriers. In a specific implementation process, whether unified beam management may be performed on the corresponding second carriers with a certain first carrier may be determined according to relative position in frequency domains between the second carriers and all the first carriers and the beam management capability information of the terminal. If yes, unified beam management is performed on the second carriers and a certain first beam; otherwise, it is believed that individual beam management is needed. As such, when a plurality of secondary carriers exist in the terminal, if two of the secondary carriers have a small frequency difference and consequently the optimal beam directions have a small deviation, unified beam management may be adopted between the two secondary carriers to further reduce signaling overhead caused by beam management. Here, a method of determining the relative position in the frequency domain between the first carriers and the second carriers and a method of judging whether to adopt individual beam management or unified beam management may refer to determination of the relative position in the frequency domain between the primary carrier and the secondary carriers and judging of whether the secondary carrier individual beam management condition is met in the example of the disclosure, which is not repeated here.

When individual beam management is performed on the secondary carriers at the base station side, the method may further include:

the reference signal is sent on the secondary carrier with a beam in a different direction; and a measurement result of the terminal on the reference signal is received. The measurement result includes, but is not limited to, a reference signal received power and/or a reference signal received quality of the beam. In some examples, the measurement result may also be optimal beam direction indication information, such as a beam index of an optimal beam selected by the terminal based on measurement.

The reference signal here includes, but is not limited to: a channel status information-reference signal (CSI-RS). For example, the reference signal may further include: a synchronization signal. The synchronization signal includes: a primary synchronization signal and/or a secondary synchronization signal.

Figure 6:
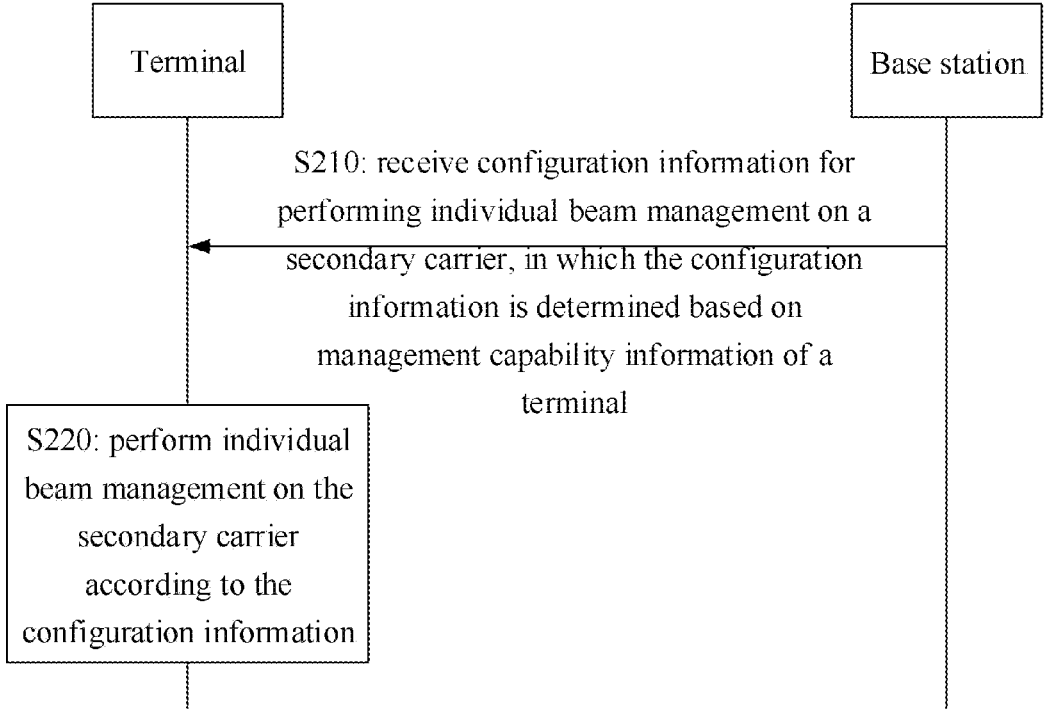
FIG. 6 is a schematic flow diagram of a beam management method illustrated according to an example.

As shown in FIG. 6, an example provides a beam management method applied to a terminal, and the beam management method includes the following steps: S210-S220.

In step S210, configuration information for performing individual beam management on a secondary carrier is received, in which the configuration information is determined based on management capability information of the terminal.

In step S220, individual beam management is performed on the secondary carrier according to the configuration information.

The terminal to which the beam management method of the example of the disclosure is applied may be various types of terminals, including but not limited to: user terminals such as a mobile phone, a wearable device, or a tablet computer, a vehicle-mounted terminal, a smart home and/or a smart office device, or the like.

In the example of the disclosure, the terminal receives the configuration information for individual beam management on the secondary carrier transmitted by a base station, the configuration information contains configuration information for the terminal to perform beam management individually, and at the moment, after receiving the configuration information, the terminal may perform individual beam management on the secondary carrier. It should be noted that, in the example of the disclosure, individual beam management on the secondary carrier may be considered for distinguishing from beam management on a primary carrier, that is, if individual beam management is performed on one secondary carrier (or individual management of beams), it is considered that: the secondary carrier and the primary carrier need to be subjected to beam measurement respectively, and measurement of optimal beam directions of the secondary carrier and the primary carrier is selected respectively based on beam measurement results. The beam measurement here includes: a beam quality measurement and/or a received power measurement, which is performed by sending the reference signal.

As such, when the terminal performs beam management on carriers according to the configuration information of the base station, instead of only performing unified beam management based on the primary carrier or individual beam management on each of the primary carrier and secondary carrier, when individual beam management on the secondary carrier is needed, individual beam management on the secondary carrier may be performed according to the beam management capability information of the terminal, and thus it is ensured that the optimal beam direction can be guaranteed during communication using the secondary carrier, and the communication quality is ensured. When individual beam management on the secondary carrier is not needed, unified beam management based on the primary carrier is performed to reduce the signaling overhead of beam management.

In the example of the disclosure, the method further includes: reporting the beam management capability information of the terminal, in which the beam management capability information is used for the base station to determine whether the secondary carrier of the terminal needs to be managed individually.

There are many methods for the base station to obtain the beam management capability information of the terminal, for example, the terminal may report the beam management capability information. Reporting, by the terminal, of the beam management capability information here includes, but is not limited to, active reporting by the terminal and reporting based on a reporting instruction of the base station.

Figure 7:
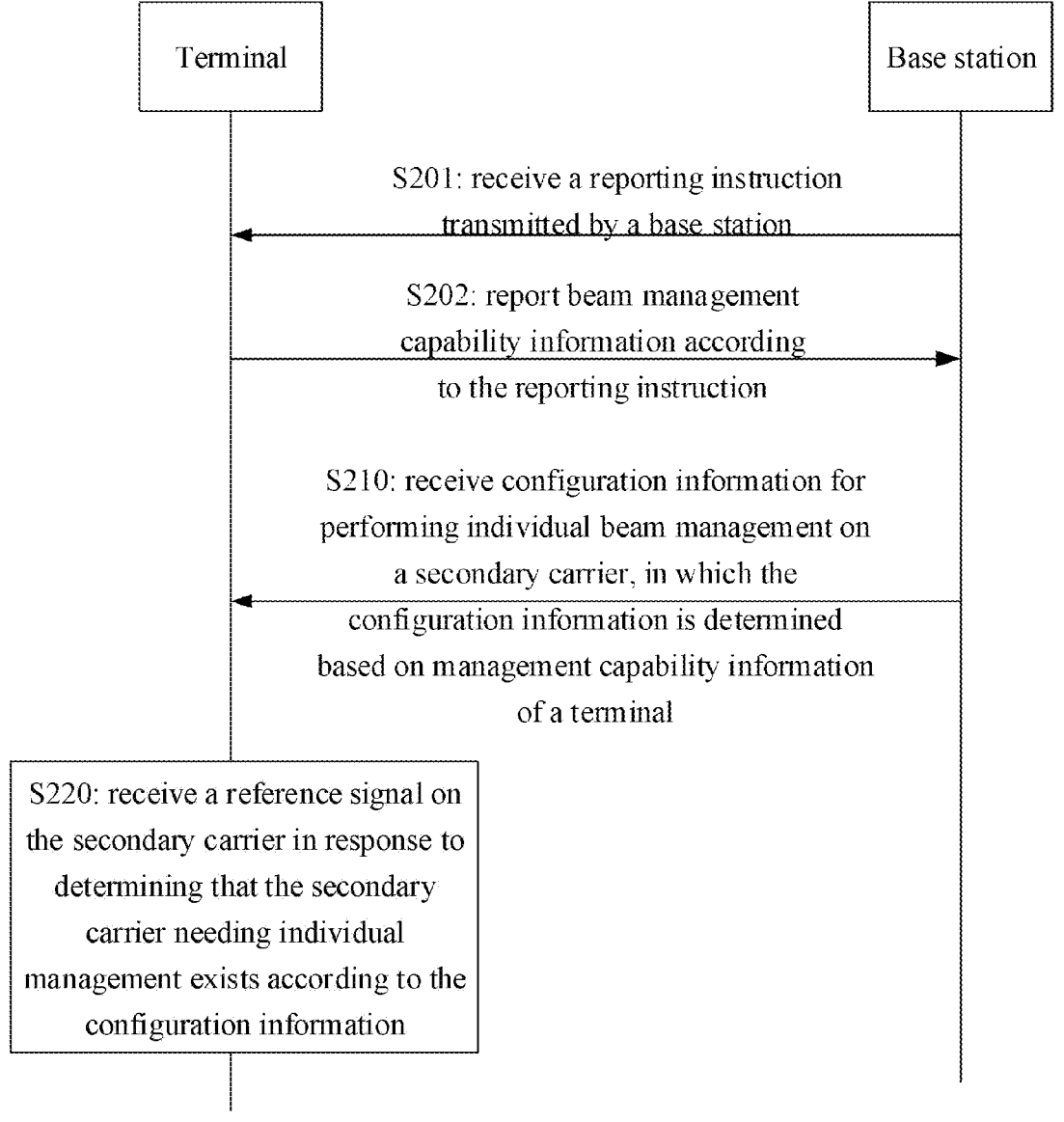
FIG. 7 is a schematic flow diagram of a beam management method illustrated according to an example.

Thus, in some examples, as shown in FIG. 7, the method further includes the following steps: S201-S202.

In step S201, the reporting instruction transmitted by the base station is received.

In step S202, the beam management capability information is reported according to the reporting instruction.

In some examples, S220 may include: receiving a reference signal on the secondary carrier in response to determining that the secondary carrier needing individual management exists according to the configuration information; and reporting a measurement result on the reference signal.

The reference signal measured here includes, but is not limited to, a CSI-RS. In some examples, in a word, the reference signal described in the example of the disclosure is various reference signals for measuring beam quality in different beam directions.

The terminal scans the reference signals sent by beams in different beam directions on the same carrier to determine the received quality of one carrier in different beam directions, and then the optimal beam direction of the primary carrier and any one secondary carrier may be selected to be used according to the received quality. The communication quality can be ensured by communication based on the selected optimal beam direction.

The reported measurement result may include one or more of the following:

reference signal received power in each beam direction;

reference signal received quality in each beam direction;

a beam index of the optimal beam direction; or a beam index set of the optimal beam direction, the beam index set corresponding to one or more beam indexes.

Figure 9:
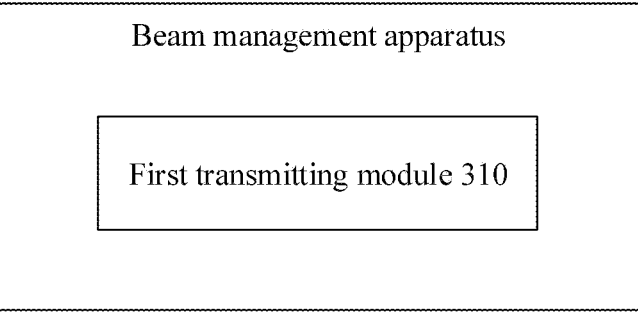
FIG. 9 is a schematic structural diagram of a beam management apparatus illustrated according to an example.

As shown in FIG. 9, an example of the disclosure provides a beam management apparatus applied to a base station, and the beam management apparatus includes:

a first transmitting module 310 configured to transmit configuration information for performing individual beam management on a secondary carrier according to beam management capability information of a terminal.

In some examples, the first transmitting module 310 may be a program module. The program module, after being executed by a processor, can implement transmitting the configuration information for performing individual beam management on the secondary carrier configured for the terminal according to the beam management capability information of the terminal, and thus the terminal and the base station can perform individual management on the secondary carrier of the terminal.

In some examples, the first transmitting module 310 may be a software-hardware combined module that includes, but is not limited to, various programmable arrays. The programmable arrays include, but are not limited to, a field programmable array or a complex programmable array.

In some other examples, the first transmitting module 310 may be a pure hardware module, which includes, but is not limited to, an application-specific integrated circuit.

In some examples, the first transmitting module includes:

a first determining unit configured to determine a relative position in the frequency domain between a primary carrier and any secondary carrier of the terminal;

a second determining unit configured to determine whether the secondary carrier meets a secondary carrier individual beam management condition according to the relative position in the frequency domain and the beam management capability information; and a transmitting unit configured to transmit the configuration information for performing individual beam management on the secondary carrier meeting the secondary carrier individual beam management condition in response to determining that the secondary carrier meets the secondary carrier individual beam management condition.

In some examples, the second determining unit is configured to determine that the secondary carrier with the relative position in the frequency domain to the primary carrier exceeding a unified management capability range of the terminal based on the primary carrier meets the secondary carrier individual beam management condition in response to determining that the relative position in the frequency domain to the primary carrier exceeds a unified management capability of the terminal based on the primary carrier according to the relative position in the frequency domain and the beam management capability information.

In some examples, the relative position in the frequency domain is indicated by at least one of the following parameters:

a frequency difference between center frequencies of the primary carrier and the secondary carrier;

a ratio of the difference between the center frequencies of the primary carrier and the secondary carrier to a sum of the center frequencies of the primary carrier and the secondary carrier; or a frequency difference between a frequency band of the primary carrier and a frequency band of the secondary carrier.

In some examples, the apparatus further includes:

a first receiving module configured to send, to the terminal, a reporting instruction of a multi-carrier beam management capability; and the first transmitting module 310 configured to receive the beam management capability information sent by the terminal according to the reporting instruction.

In some examples, the first transmitting module 310 is configured to send a reference signal on a secondary carrier in response to determining that the secondary carrier needing individual management exists.

The apparatus further includes:

a first receiving module configured to receive a measurement result of the terminal on the reference signal.

Figure 10:
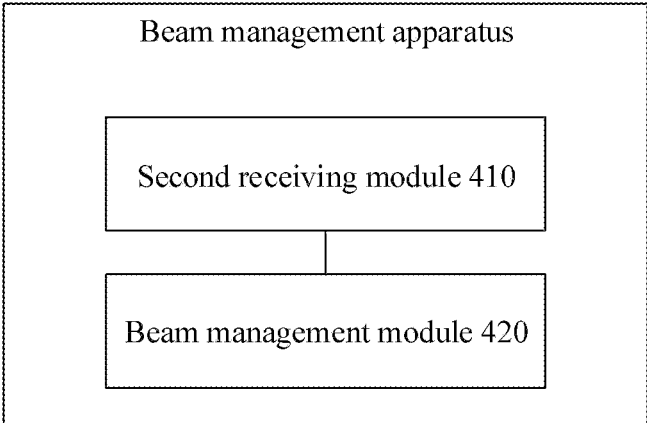
FIG. 10 is a schematic structural diagram of another beam management apparatus illustrated according to an example.

As shown in FIG. 10, an example provides a beam management apparatus applied to a terminal, including:

a second receiving module 410 configured to receive configuration information for performing individual beam management on a secondary carrier, in which the configuration information is determined based on management capability information of the terminal; and a beam management module 420 configured to perform individual beam management on the secondary carrier according to the configuration information.

In some examples, the second receiving module 410 and the beam management module 420 may be program modules. The program modules, after being executed by a processor, can implement individual beam management on the secondary carrier, and thus, when individual beam management needs to be performed on the secondary carrier, individual beam management on the secondary carrier is performed to ensure the communication quality on the secondary carrier.

In some other examples, the second receiving module 410 and the beam management module 420 may be software-hardware combined modules, which include, but are not limited to, various programmable arrays. The programmable arrays include, but are not limited to: a complex programmable array or a field programmable array.

In some examples, the apparatus further includes:

a second sending module configured to report the beam management capability information of the terminal, in which the beam management capability information is used for a base station to determine whether the secondary carrier needs individual beam management.

In some examples, the second receiving module 410 is configured to receive a reporting instruction transmitted by the base station; and the second sending module is configured to report the beam management capability information according to the reporting instruction.

In some examples, the beam management module 420 is configured to receive a reference signal on a secondary carrier in response to determining that the secondary carrier needing individual beam management exists according to the configuration information; and report a measurement result on the reference signal.

An example of the disclosure provides a communication device, including a processor, a transceiver, a memory and an executable program stored on the memory and capable of being operated by the processor, where the executable program, when operated by the processor, executes the beam management method applied to the terminal provided by any aforementioned technical solution or the beam management method applied to the base station provided by any aforementioned technical solution.

The communication device may be the aforementioned base station or terminal.

The processor may include storage media of various types. The storage media are non-temporary computer storage media, and can continue to memorize information stored after the communication device is powered down. Here, the communication device includes the base station or user equipment.

The processor may be connected with the memory via a bus and the like, and is configured to read the executable program stored on the memory, such as at least one of the methods shown in FIG. 2 or FIG. 5.

An example of the disclosure provides a computer storage medium, storing an executable program, where the executable program, after being executed by a processor, can implement the method shown by any technical solution of the first aspect or the second aspect, such as at least one of the methods shown in FIG. 2 or FIG. 5.

Several examples are provided below in combination with any example.

Example 1

The disclosure is for the problems in an existing beam management solution; a unified beam management solution is adopted for all multi-carrier scenarios without considering the capability of different terminals, which may cause a relatively poor beam direction on certain carriers and affect the link performance. In order to reduce the problems above, a solution provided by this example selects different beam management solutions according to the different capabilities of the terminals, which may avoid the selection of a poor beam direction by a terminal with low capability and may also save the signaling overhead of a terminal with high capability.

The application scenarios of the beam management method provided by this example include, but are not limited to, at least one of the following:

a carrier aggregation technology and a dual connectivity (DC) technology, further including a multi-RAT dual connectivity (MRDC) technology, such as EUTRA-NR dual connection (EN-DC) of auxiliary nodes of a 4G network and NR-E-UTRA dual connectivity (NE-DC) of a 5G network.

Figure 11:
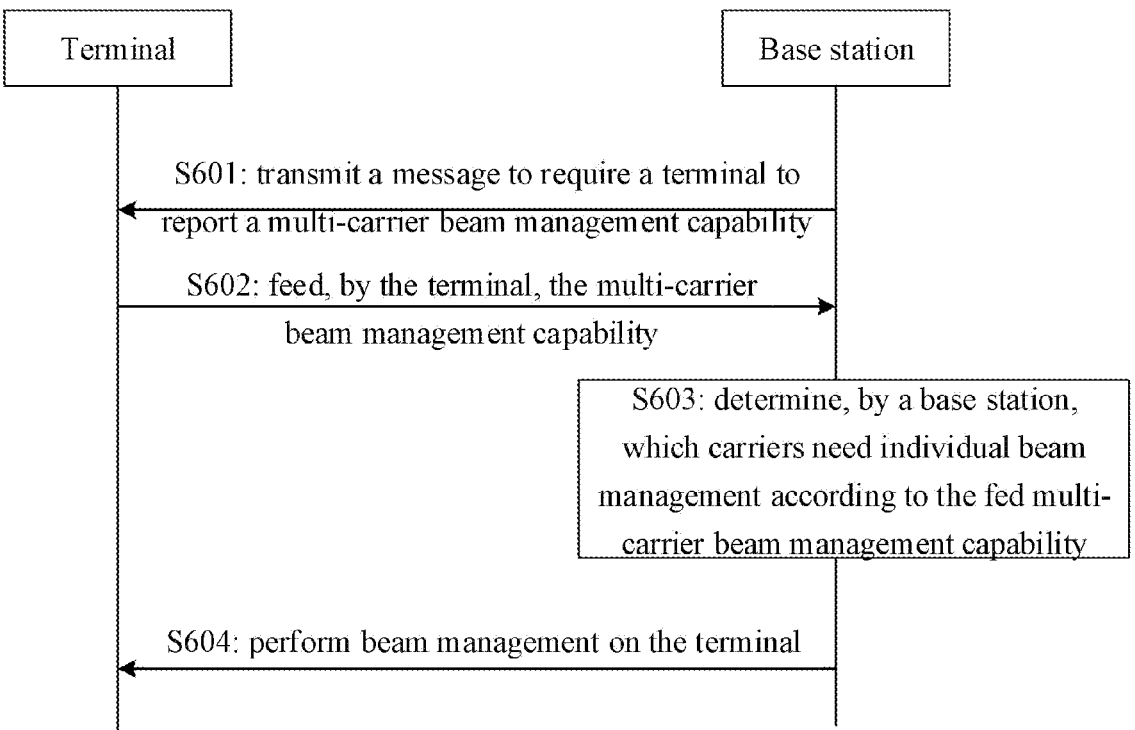
FIG. 11 is a schematic flow diagram of a beam management method illustrated according to an example.

A base station side transmits a message to a terminal to require the terminal to report a beam management capability in a multi-carrier case, the terminal reports the beam management capability in the multi-carrier case, and a base station determines whether individual beam management needs to be performed on some carriers according to the multi-carrier beam management capability reported by the terminal. As shown in a specific schematic flow diagram in FIG. 11, it includes the following steps: S601-S604.

In step S601, the base station transmits the message to the terminal to require the terminal to report the multi-carrier beam management capability, for example, the base station requires the terminal to report the multi-carrier beam management capability through a reporting instruction.

In step S602, the terminal feeds back the multi-carrier beam management capability, for example, the terminal indicates its multi-carrier beam management capability through beam management capability information.

In step S603, the base station determines which beams need individual beam management according to the multi-carrier management capability fed back by the terminal.

In step S604, beam management is performed on the terminal.

Example 2

When a base station configures other carriers (at least including secondary carriers here) for a terminal, the base station transmits a message to the terminal to require the terminal to report a beam management capability in a multi-carrier case, the terminal reports the beam management capability in the multi-carrier case, and the base station determines whether individual beam management needs to be performed on some carriers according to the multi-carrier beam management capability reported by the terminal.

In one example, the difference of the beam management capability reported by the terminal may be indicated through bit values, such as "low", "intermediate", and "high", or "low" and "high". After the base station receives the message, according to a carrier where beam management is located (namely the base station needs to emit a reference signal or a synchronization signal on the carrier, which is generally a primary carrier), and whether a positional relation between secondary carriers needing to be configured meets a requirement for requiring the terminal to report, if the requirement is not met, it is determined that individual beam management needs to be performed on the secondary carriers, that is, the reference signal is emitted.

A method for determining "low", "intermediate", and "high" may be determined according to different frequency bands and different positions of carriers. In one example, it may be determined according to the following.

Center frequencies of two carriers on a frequency band A are set to be f1 and f2, and a determination is made according to a parameter value: $F1=2*(f2-f1)/(f1+f2)$. For example, when F1 is smaller than a certain value X1, it is considered "low". When F1 is between X1 and X2, it is considered "intermediate". When F1 is greater than X2, it is considered "high". X2 is greater than X1. Here, X1 and X2 are both threshold values for determining a relative position in the frequency domain supported by the terminal.

In another example, the method of determining capability levels according to the different frequency bands and the different positions of the carriers may be directly decided according to a distance difference between two carriers. For example, a parameter F2 is equal to f2−f1. When F2 is smaller than a certain value Y1, it is considered "low". When F2 is between Y1 and Y2, it is considered "intermediate". When F2 is greater than Y2, it is considered "high". Y2 is greater than Y1.

When the base station receives the capability levels reported by the terminal, for example, a capability level reported by a certain terminal on the frequency band A is "low", the base station calculates whether F1 or F2 is greater than X1 or Y1 according to information of carriers needing to be configured for the terminal.

If yes, the base station determines that a reference signal for performing beam management needs to be configured on a secondary carrier, such as a channel state information reference signal (CSI-RS) or a synchronization signal block (SSB) signal. The terminal scans the signal and determines an optimal beam i for downlink reception on the secondary carrier according to the strength of the signal, such as maximum reference signal received power (RSRP).

If not, the base station does not need to perform beam management on the secondary carrier; that is, the reference signal, such as the channel state information reference signal (CSI-RS) or the SSB signal, does not need to be emitted additionally on the carrier. That is, if the optimal beam direction of the terminal on the primary carrier is i, the beam direction i is also adopted on other secondary carriers.

Example 3

In one example, a beam management capability reported by a terminal may be specific parameter values that are reported directly. For example, the values are F1 or F2 in example 1. According to a specific parameter value reporting method, the required number of bits is determined according to required reporting precision. For example, four different values may be reported for 2-bit information, and F1 reporting is taken as an example in the following table.

TABLE 1

| Values corresponding to F1 | Bit values |
| --- | --- |
| F1_1 | 00 |
| F1_2 | 01 |
| F1_3 | 10 |
| F1_4 | 11 |

A base station receives the specific parameter values corresponding to capability levels reported by the terminal, and then the base station calculates whether F1 or F2 is greater than X1 or Y1 according to information of carriers needing to be configured for the terminal. If yes, the base station determines that a reference signal for performing beam management needs to be configured on a secondary carrier. If not, the base station does not need to perform beam management on the secondary carrier; that is, the base station does not need to emit the reference signal additionally on the carrier.

Example 4

In another example, if a secondary carrier needing to be configured by a base station is on another frequency band. As shown in FIG. 8B, a carrier 1 is on a frequency band A, and a carrier 2 is on a frequency band B. In some solutions, individual beam management may be directly adopted for carrier aggregation between the frequency bands, and although this solution can guarantee better performance on the secondary carrier, extra signaling overhead is needed. However, in practice, in a case where some terminals possess advanced capabilities, or a frequency interval between two frequency bands, such as the frequency band A and the frequency band B, that is not too large, unified beam management may still be adopted. Accordingly, also in order to consider the capability of terminals, the methods in examples 1, 2, and 3 above can still be used.

Figure 12:
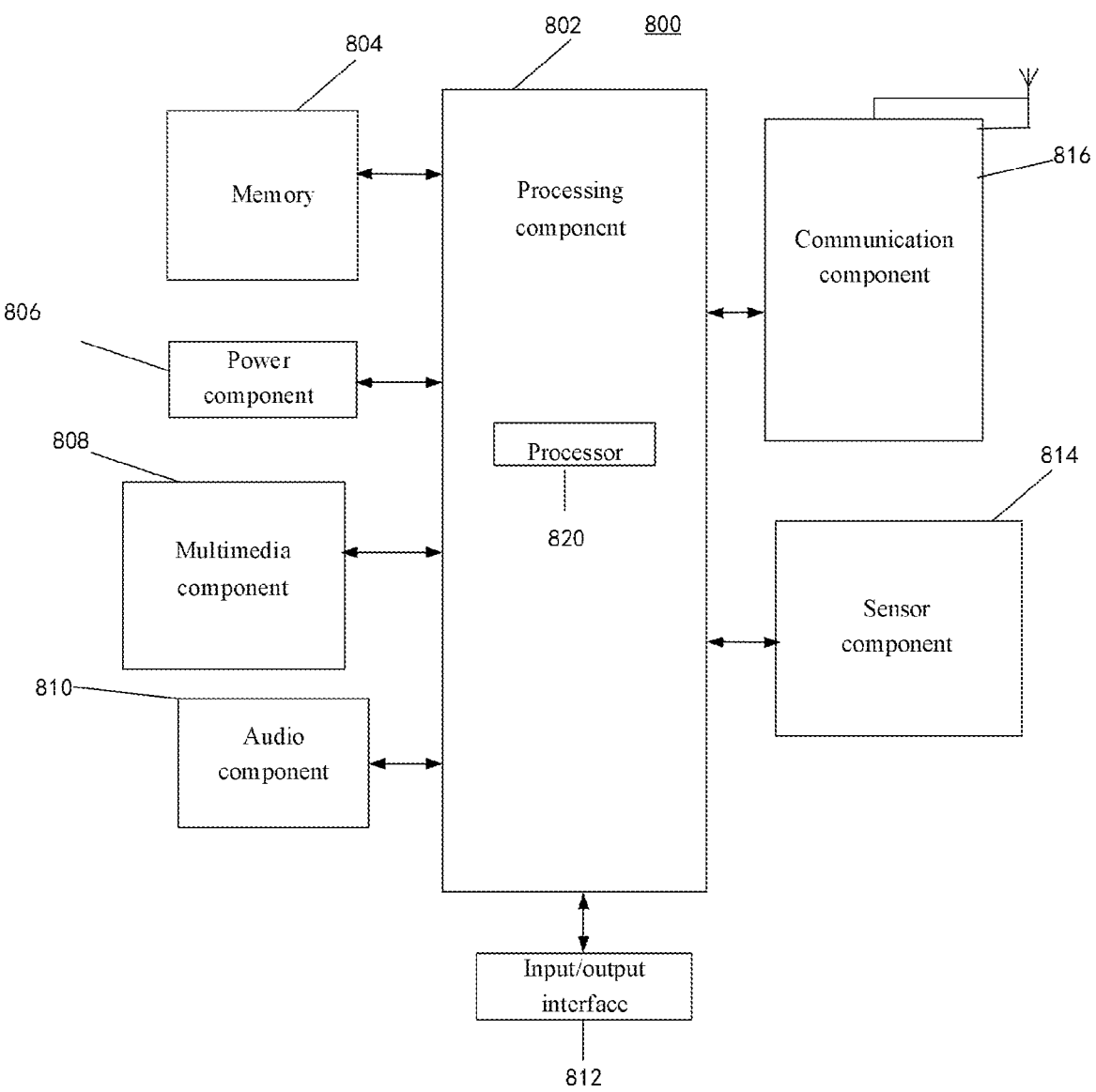
FIG. 12 is a schematic structural diagram of UE illustrated according to an example.

FIG. 12 is a block diagram of UE 800 illustrated according to an example. For example, the UE 800 may be a mobile phone, a computer, digital broadcasting user equipment, a messaging device, a game console, a tablet device, a medical device, a fitness device, a personal digital assistant, etc.

Referring to FIG. 12, the UE 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls the overall operation of the UE 800, such as operations associated with display, telephone call, data communication, camera operations, and recording operations. The processing component 802 may include one or more processors 820 to execute instructions to complete all or part of the steps of the above method. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various data types to support operations at the UE 800. Examples of these data include instructions for any application or method operating on the UE 800, contact data, phonebook data, messages, pictures, videos, etc. The memory 804 may be implemented by any type of volatile or nonvolatile storage device or their combinations, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optic disk.

The power component 806 provides power for various components of the UE 800. The power component 806 may include a power management system, one or more power sources, and other components associated with generating, managing, and distributing power for the UE 800.

The multimedia component 808 includes a screen providing an output interface between the UE 800 and a user. In some examples, the screen may include a liquid crystal display (LCD) and a touch panel (TP). If the screen includes the touch panel, the screen may be implemented as a touch screen to receive an input signal from the user. The touch panel includes one or more touch sensors to sense touch, swiping, and gestures on the touch panel. The touch sensor can not only sense the boundary of the touch or swiping operation, but also detect the duration and pressure related to the touch or swiping operation. In some examples, the multimedia component 808 includes a front camera and/or a rear camera. When the UE 800 is in an operation mode, such as a shooting mode or a video mode, the front camera and/or the rear camera can receive external multimedia data. Each front camera and rear camera can be a fixed optical lens system or have a focal length and optical zoom capability.

The audio component 810 is configured to output and/or input audio signals. For example, the audio component 810 includes a microphone (MIC) configured to receive an external audio signal when the UE 800 is in the operation mode, such as a call mode, a recording mode, and a speech recognition mode. The received audio signal may be further stored in the memory 804 or transmitted via the communication component 816. In some examples, the audio component 810 also includes a speaker for outputting an audio signal.

The I/O interface 812 provides an interface between the processing component 802 and a peripheral interface module, which can be a keyboard, a click wheel, a button, etc. These buttons may include, but are not limited to: a home button, volume buttons, a start button, and a lock button.

The sensor component 814 includes one or more sensors to provide state evaluation of various aspects of the UE 800.

For example, the sensor component 814 can detect an on/off state of the UE 800 and the relative positioning of the components, for example, the component is a display and a keypad of the UE 800. The sensor component 814 can also detect the change of the position of the UE 800 or one component of the UE 800, the presence or absence of user contact with the UE 800, the azimuth or acceleration/deceleration of the UE 800, and temperature change of the UE 800. The sensor component 814 may include a proximity sensor configured to detect the presence of nearby objects without any physical contact. The sensor component 814 may further include an optical sensor, such as a CMOS or CCD image sensor, for use in imaging applications. In some examples, the sensor component 814 may further include an acceleration sensor, a gyroscope sensor, a magnetic sensor, a pressure sensor, or a temperature sensor.

The communication component 816 is configured to facilitate wired or wireless communication between the UE 800 and other devices. The UE 800 may access a wireless network based on a communication standard, such as WiFi, 2G, 3G, or their combinations. In an example, the communication component 816 receives a broadcast signal or broadcast-related information from an external broadcast management system via a broadcast channel. In an example, the communication component 816 further includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology, and other technologies.

In an example, the UE 800 may be implemented by one or more application-specific integrated circuits (ASIC), digital signal processors (DSP), digital signal processing devices (DSPD), programmable logic devices (PLD), field programmable gate arrays (FPGA), controllers, microcontrollers, microprocessors, or other electronic elements for performing the above method.

In an example, a non-temporary computer-readable storage medium including instructions, such as the memory 804 including instructions, which can be executed by the processor 820 of the UE 800 to complete the above method, is also provided. For example, the non-temporary computer-readable storage medium may be a ROM, a random access memory (RAM), a CD-ROM, a magnetic tape, a floppy disk, an optical data storage device, etc.

Figure 13:
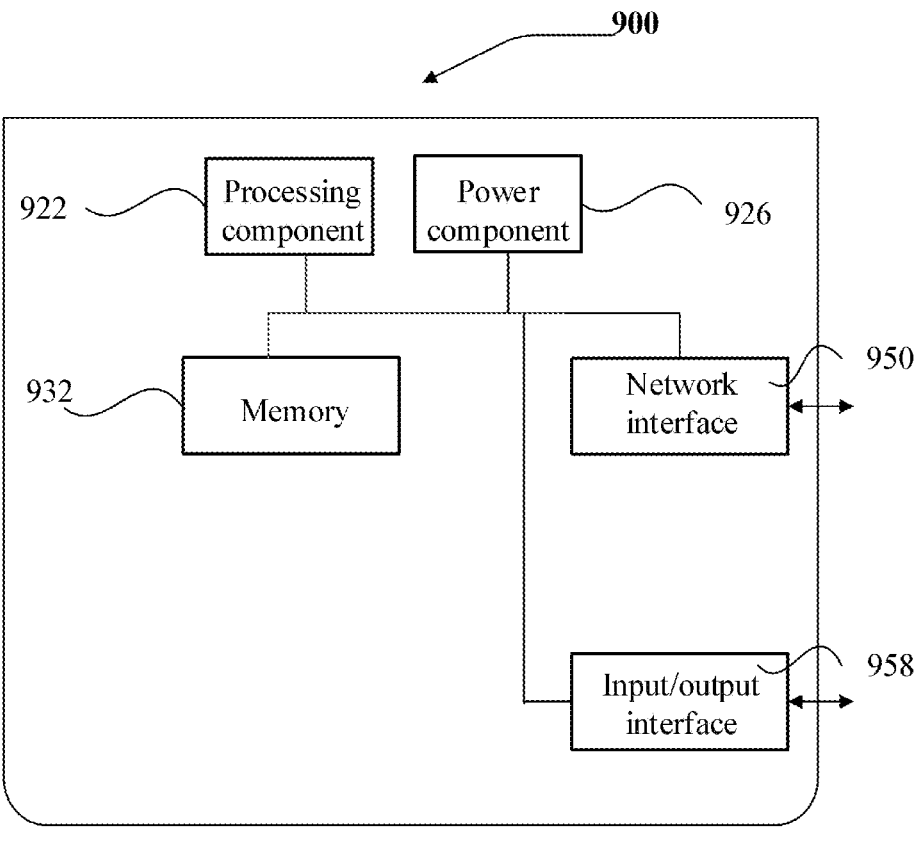
FIG. 13 is a schematic structural diagram of a base station illustrated according to an example.

As shown in FIG. 13, an example of the disclosure shows a structure of a base station. For example, the base station 900 may be provided as a network-side device. Referring to FIG. 13, the base station 900 includes a processing component 922, which further includes one or more processors, and a memory resource represented by a memory 932 for storing instructions, such as applications, that can be executed by the processing component 922. The applications stored in the memory 932 may include one or more modules, each corresponding to a set of instructions. In addition, the processing component 922 is configured to execute instructions to execute any method applied to the base station above, such as the methods shown in FIGS. 2-3.

The base station 900 may further include a power component 926 configured to perform power management of the base station 900, a wired or wireless network interface 950 configured to connect the base station 900 to the network, and an input/output (I/O) interface 958. The base station 900 can operate an operating system based on the memory 932, such as Windows Server™, Mac OS X™, Unix™, Linux™, FreeBSD™, or the like.

Other examples of the disclosure will be apparent to those skilled in the art from consideration of the specification and practice of the disclosure here. The disclosure is intended to cover any variations, uses, or adaptations of the disclosure following the general principles and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes may be made without departing from the scope of the disclosure. It is intended that the scope of the disclosure be limited only by the appended claims.

What is claimed is:

1. A beam management method, performed by a base station, and comprising:
transmitting, according to beam management capability information of a terminal, configuration information for performing individual beam management on a secondary carrier;
wherein the method further comprises:
sending a reference signal on the secondary carrier in response to determining that the secondary carrier needing individual beam management exists; and
receiving a measurement result of the terminal on the reference signal.

2. The beam management method according to claim 1, wherein transmitting the configuration information for performing individual beam management on the secondary carrier according to the beam management capability information of the terminal, comprises:
determining a relative position in a frequency domain between a primary carrier and any secondary carrier of the terminal;
determining whether the secondary carrier meets a secondary carrier individual beam management condition according to the relative position in the frequency domain and the beam management capability information; and
transmitting the configuration information for performing individual beam management on the secondary carrier meeting the secondary carrier individual beam management condition, in response to determining that the secondary carrier meets the secondary carrier individual beam management condition.

3. The beam management method according to claim 2, wherein determining whether the secondary carrier meets the secondary carrier individual beam management condition according to the relative position in the frequency domain and the beam management capability information, comprises:
determining that the secondary carrier with the relative position in the frequency domain to the primary carrier exceeding a unified management capability range of the terminal based on the primary carrier meeting the secondary carrier individual beam management condition, in response to determining that the relative position in the frequency domain to the primary carrier exceeds a unified management capability of the terminal based on the primary carrier according to the relative position in the frequency domain and the beam management capability information.

4. The beam management method according to claim 3, wherein the relative position in the frequency domain is indicated by at least one of following parameters:

a frequency difference between center frequencies of the primary carrier and the secondary carrier;

a ratio of the difference between the center frequencies of the primary carrier and the secondary carrier to a sum of the center frequencies of the primary carrier and the secondary carrier; or a frequency difference between a frequency band of the primary carrier and a frequency band of the secondary carrier.

5. The beam management method according to claim 1, further comprising:

sending, to the terminal, a reporting instruction of a multi-carrier beam management capability; and receiving the beam management capability information sent by the terminal according to the reporting instruction.

6. A beam management method, performed by a terminal, and comprising:

receiving configuration information for performing individual beam management on a secondary carrier, wherein the configuration information is determined based on management capability information of the terminal; and performing individual beam management on the secondary carrier according to the configuration information;

wherein performing individual beam management on the secondary carrier according to the configuration information comprises:

receiving a reference signal on the secondary carrier in response to determining that the secondary carrier needing individual beam management exists according to the configuration information; and reporting a measurement result regarding the reference signal.

7. The beam management method according to claim 6, further comprising:

reporting beam management capability information of the terminal, wherein the beam management capability information is used for a base station to determine whether the secondary carrier needs individual beam management.

8. The beam management method according to claim 7, further comprising:

receiving a reporting instruction transmitted by the base station, wherein reporting the beam management capability information of the terminal comprises:

reporting the beam management capability information according to the reporting instruction.

9. The beam management method according to claim 7, wherein performing individual beam management on the secondary carrier according to the configuration information, comprises:

receiving the reference signal on the secondary carrier in response to determining that the secondary carrier needing individual beam management exists according to the configuration information; and reporting the measurement result regarding the reference signal.

10. The beam management method according to claim 8, wherein performing individual beam management on the secondary carrier according to the configuration information, comprises:

receiving the reference signal on the secondary carrier in response to determining that the secondary carrier needing individual beam management exists according to the configuration information; and reporting the measurement result regarding the reference signal.

11. A communication device, comprising:

a processor;

a transceiver;

a memory that stores an executable program; wherein the executable program is capable of being executed by the processor, and the processor is configured to:

transmit configuration information for performing individual beam management on a secondary carrier according to beam management capability information of a terminal, wherein the processor is further configured to:

send a reference signal on the secondary carrier in response to determining that the secondary carrier needing individual beam management exists; and receive a measurement result of the terminal on the reference signal.

12. The communication device according to claim 11, wherein the processor is further configured to:

determine a relative position in a frequency domain between a primary carrier and any secondary carrier of the terminal;

determine whether the secondary carrier meets a secondary carrier individual beam management condition according to the relative position in a frequency domain and the beam management capability information; and transmit the configuration information for performing individual beam management on the secondary carrier meeting the secondary carrier individual beam management condition, in response to determining that the secondary carrier meets the secondary carrier individual beam management condition.

13. The communication device according to claim 12, wherein the processor is further configured to:

determine that the secondary carrier with the relative position in the frequency domain to the primary carrier exceeds a unified management capability range of the terminal based on the primary carrier meeting the secondary carrier individual beam management condition, in response to determining that the relative position in the frequency domain to the primary carrier exceeds a unified management capability of the terminal based on the primary carrier according to the relative position in the frequency domain and the beam management capability information.

14. The communication device according to claim 13, wherein the relative position in the frequency domain is indicated by at least one of following parameters:

a frequency difference between center frequencies of the primary carrier and the secondary carrier;

a ratio of the difference between the center frequencies of the primary carrier and the secondary carrier to a sum of the center frequencies of the primary carrier and the secondary carrier; or a frequency difference between a frequency band of the primary carrier and a frequency band of the secondary carrier.

15. The communication device according to claim 11, wherein the processor is further configured to:

send, to the terminal, a reporting instruction of a multi-carrier beam management capability; and receive the beam management capability information sent by the terminal according to the reporting instruction.

16. A communication device, comprising:

a processor;

a transceiver;

a memory that stores an executable program, wherein the executable program is capable of being executed by the processor, and the executable program, when executed by the processor, causes the processor to perform the beam management method provided by claim 6.

17. A non-transitory computer storage medium, storing an executable program, wherein the executable program, after being executed by a processor, can implement the beam management method provided by claim 1.

18. A non-transitory computer storage medium, storing an executable program, wherein the executable program, after being executed by a processor, can implement the beam management method provided by claim 6.

19. The beam management method according to claim 1, wherein the beam management capability information comprises at least one of the following:

indication information of a strength level of a multi-carrier unified management capability of the terminal; or indication information of an inter-carrier maximum relative position in a frequency domain supported by the terminal during performance of multi-carrier unified management.

20. The beam management method according to claim 19, wherein the multi-carrier unified management is configured to indicate that a primary carrier and at least one secondary carrier are the same in optimal beam direction.

* * * * *